United States Patent [19]
Kobetz et al.

[11] 3,784,423
[45] Jan. 8, 1974

[54] CRYSTALLINE BERYLLIUM HYDRIDE
[75] Inventors: Paul Kobetz, Baton Rouge, La.; Leonard M. Niebylaski, Birmingham, Mich.
[73] Assignee: Ethyl Corporation, New York, N.Y.
[22] Filed: Aug. 24, 1964
[21] Appl. No.: 392,677

[52] U.S. Cl.............. 149/109, 423/645, 423/646, 423/647
[51] Int. Cl....... C06b 15/00, C01b 6/04, C01l 6/24
[58] Field of Search.............. 23/204; 423/645, 423/646, 647; 149/109

[56] References Cited
UNITED STATES PATENTS
2,994,587  5/1961  Vose.................................. 423/647

OTHER PUBLICATIONS
Jones, "Fundamental Principles of Powder Metallurgy" pp. 351–355, 420–421, 422, 428–432, Edward Arnold (Publishers) Ltd., London, 1960.

*Primary Examiner*—Leland A. Sebastian
*Attorney*—Donald L. Johnson, John F. Sieberth and Lewis Hess

EXEMPLARY CLAIM

1. A crystalline beryllium hydride-containing composite which consists essentially of from about 99.5 to about 80.0 mole percent of beryllium hydride and from about 0.5 to about 20.0 mole percent of lithium hydride.

4. A crystalline beryllium hydride-containing composite which consists essentially of from about 0.5 to about 20.0 mole percent of a compound selected from the group consisting of lithium hydride and lithium aluminum hydride and from about 99.5 to about 80.0 mole percent of beryllium hydride and which is characterized by a density exceeding 0.75 gram per cc and by intense X-ray diffraction lines at $d = 3.78$ and $d = 2.95$.

8 Claims, No Drawings

CRYSTALLINE BERYLLIUM HYDRIDE

This invention relates to a novel composition of matter, crystalline beryllium hydride, and to methods for preparing it.

Beryllium hydride has been synthesized by Coates and Glockling [J. Chem. Soc. 2526(1954)] by the pyrolysis of di-tertiary butyl beryllium etherate and by Head, Holley and Rabideau [J. Am. Chem. Soc. 79, 3687(1957)] using ether-free di-tertiary butyl beryllium. More recently a superior product has been obtained by the pyrolysis of tertiary butyl beryllium etherate dissolved in a high-boiling inert solvent (co-pending application Ser. No. 176,865, filed Feb. 26, 1962).

Because of its high reducing power and low molecular weight, beryllium hydride is of great interest as a potential fuel component of solid rocket propellants. For this utility a relatively high density is of great importance. The beryllium hydride products of the above synthetic processes are without exception amorphous in structure and as a result are characterized by a relatively low density, 0.63 to 0.67 gram per cc, which limits their suitability for this application.

Accordingly, it is an object of this invention to provide a form of beryllium hydride having a density greater than that of hitherto known forms of this compound. Another object of this invention is to provide a crystalline form of beryllium hydride. A further object of this invention is to provide a novel method for the preparation of crystalline beryllium hydride. Additional objects will appear hereinafter.

In accordance with the present invention, it has been found that when amorphous beryllium hydride containing a relatively minor amount of certain lithium compounds is subjected to compaction at elevated temperature and pressure, the hydride is converted to a crystalline material of significantly higher density than the amorphous beryllium hydride similarly compacted in the absence of additives. A number of lithium compounds have been found effective for inducing crystallization via compaction.

A preferred embodiment of the present invention is the use as starting material in the above-described process of beryllium hydride containing from about 0.5 to about 20.0 mole percent of lithium hydride.

Another preferred embodiment of the present invention is the use as raw material in the above process of amorphous beryllium hydride containing a relatively small amount (from about 0.5 to about 20.0 mole percent) of lithium aluminum hydride.

Another preferred embodiment of this invention is crystalline beryllium hydride containing a relatively small proportion of lithium hydride.

A particularly preferred embodiment of this invention is the process of preparing crystalline beryllium hydride by heating amorphous beryllium hydride containing a relatively small amount of lithium aluminum hydride or of n-butyl lithium at a temperature in the approximate range of 160° to 250°C. and at a pressure in the approximate range of 100,000 to 500,000 psig for a period of 5 minutes to 2 hours and allowing the material to cool to near ambient temperature while the pressure is maintained.

Another particularly preferred embodiment of this invention is the process of preparing crystalline beryllium hydride by pyrolyzing, in an inert high-boiling solvent and under an inert atmosphere, a mixture of a di-tertiary alkyl beryllium etherate, wherein each tertiary alkyl radical contains from four to about 20 carbon atoms, and about 0.5 to about 20 mole percent of a lithium alkyl containing from two to about eight carbon atoms, separating the insoluble pyrolysis product, heating the latter for a period of 5 minutes to about 2 hours at from about 150° to about 300°C. and under a pressure of from 100 to about 500 psig, and allowing the product to cool to near ambient temperature while the pressure is maintained. This procedure is particularly preferred because it provides for uniform distribution of the lithium additive in the unfused beryllium hydride by mixing the additive and the beryllium hydride precursor in dissolved form. Such uniformity leads to a product of particularly desirable properties.

The crystalline beryllium hydride of this invention is clearly superior to the amorphous product hitherto known and exhibits a number of distinct advantages thereover. For instance, its increased density results in a reduced storage space requirement and in a higher delivered thrust, which makes it particularly effective in rocket fuel applications. Furthermore, the crystalline character of the product leads to increased compatibility with other fuel components and to increased ease of handling and mixing.

The invention will be more fully understood by reference to the following set of illustrative examples in which all parts and percentages are by weight.

EXAMPLE I

A solution of 0.16 part of n-butyl lithium in 1.0 part of hexane was dissolved in 19.7 parts of di-tertiary butyl beryllium etherate prepared by the reaction of tertiary butyl Grignard reagent with beryllium chloride in ether solution. The mixture was introduced dropwise under an atmosphere of dry nitrogen into 75 parts of dodecane heated to 200° to 205°C. The addition required about 10 minutes for completion, after which the system was maintained at the above temperature for an additional 10 minutes. The beryllium hydride product was removed by filtration, washed with petroleum naphtha and dried for one hour at 100°C. under a reduced prssure of 80 mm of mercury. The purity of the product as measured by total hydrogen evolved upon acid hydrolysis was 94.1 percent by weight. X-ray diffraction analysis showed the product to be amorphous. The density of the product determined by the sink-float method was 0.68g/cc.

The sink-float method consists simply of adding a lump of material to a hydrocarbon solvent and varying the temperature until the particle begins to sink or to float. The temperature at which this occurs is recorded and the density of the solvent (equal to the density of the solids) is determined from a preconstructed curve for which the density-temperature relationship has been determined. Benzene, nonane, 1,3,5-trimethyl benzene, and methylcyclohexane were the solvents used.

A small sample of the product was placed in a ½-inch tempered steel die and a piston inserted while die and sample were still under nitrogen. The die and piston were encased in a section of pipe bellows fitted with a nitrogen flush and transferred to a mechanical press having heating means, temperature-measuring means, and pressure-measuring means. After placing the sample under a pressure of about 100,000 psi, heat was applied until the piston temperature reached 200°C. the pressure was then increased to 200,000 psi and the system was left at this temperature and pressure for about one-half hour. After the die had been cooled to below 60°C. the pressure was released and the pellet was pressed out into a nitrogen-flushed plastic bottle.

The density of the pressed product determined by the sink-float method was 0.78g/cc. Purity by hydrolysis was 91.2 weight percent.

A sample of the product introduced into a glass capillary was subjected to X-ray diffraction analysis using a Phillips Norelco X-ray unit equipped with a 114.59 mm powder camera. A copper source at 40 kilovolts and 20 milliamperes was employed using a 3 hour exposure. The X-ray diffraction pattern was characterized by the presence of numerous intense lines indicative of a high degree of crystallinity. The strongest lines were found at $d = 3.78$, $d = 3.38$, $d = 2.95$, and $d = 2.08$.

When the n-butyllithium in Example I is replaced by tertiary butyllithium, n-hexyllithium, isooctyllithium, n-decyllithium, or lithium hydride, similar results are obtained.

EXAMPLE II

Lithium aluminum hydride (0.090 part) was dissolved in 5 parts of diethyl ether to produce a homogeneous solution containing only a trace amount of insoluble residue. The residue was removed by filtration and the ether solution added to 19.7 parts of di-tert-butylberyllium etherate prepared as described in Example I. A clear solution resulted. This solution was added dropwise to 75 parts dodecane as described in Example I. The resultant solid product was filtered, washed and dried according to the previously described procedure. Analysis by gas evolution showed the purity to be 93.4 weight percent $BeH_2$, based on total hydrogen evolved upon acid hydrolysis. The product also contained 1.21 weight percent lithium. Its density was 0.69g/cc. The product was amorphous to X-rays.

A small (0.2 g) sample of the above product was placed in a ½-inch tempered steel die and a piston inserted while the die and sample were still under nitrogen. The sample was subjected to a maximum pressure of 200,000 psi at 200°C. for 30 minutes using the procedure described in Example I. After the sample and die had cooled to below 60°, the sample was discharged from the die into a nitrogen-flushed plastic bottle. The purity of the pressed material was found to be 87.1 percent. Its density was determined by the sink-float method to be 0.79g/cc. The X-ray diffraction pattern of the pressed material showed the presence of several intense diffraction lines indicating a high degree of crystallinity. The diffraction pattern was characterized by the presence of a very strong line at $d = 3.38$ with a strong, but weaker, line at $d = 2.08$.

EXAMPLE III

A solution of 0.36 part of n-butyllithium in 3.5 parts of hexane was dissolved in 78.8 parts of ditertiary butyl beryllium etherate and the mixture was added dropwise under dry nitrogen to 225 parts of dodecane heated to 200° to 205°C. The preparation was completed as in Example I. The product, 93.5 weight percent pure beryllium hydride, was amorphous to X-rays.

The fusion was carried out as in Example I, the operating conditions being as follows: temperature, 200°C.; pressure, 200,000 psi; fusion time, 30 minutes. The resulting pellet had a density of 0.78 and exhibited strong X-ray diffraction lines at $d = 3.78$ and $d = 2.95$.

A considerable variety of organoberyllium compounds can be used in place of the ditertiary butyl beryllium etherate of Example III; similar results are obtained. Included are all beryllium alkyls having in each alkyl radical four to 20 carbon atoms and a tertiary carbon atom bonded to the beryllium atom. Examples of such compounds bis(1,1-dimethylbutyl)beryllium, bis(1,1-dimethylhexyl)beryllium, bis(1,1-diemthyldecyl)beryllium and bis(1,1-dimethyloctadecyl)beryllium. The ether of the etherate may be diethyl ether, dipropyl ether, dibutyl ether, dihexyl ether or any similar ether containing not more than about 10 carbon atoms in each alkyl radical.

The amorphous beryllium hydride used in the process of this invention can be prepared by any method which yields a product of relatively high purity. The solution pyrolysis procedure described in Example I yields a highly satisfactory starting material.

The lithium compound used to initiate the crystallization can be mixed mechanically with the amorphous beryllium hydride but, as indicated above, is preferably dissolved in the beryllium alkyl prior to pyrolysis. The lithium initiator is suitably lithium aluminum hydride or an alkyllithium compound containing from two to about eight carbon atoms, for example, ethyllithium, n-propyllithium, tertiary butyllithium, n-hexyllithium, 2-ethylhexyllithium, isononyllithium, or n-decyllithium.

A wide range of concentrations of the lithium initiator compound can be employed. Thus its concentration in the amorphous beryllium hydride can range from less than 0.5 to more than 20.0 mole percent. The preferred range of concentrations is from 1.0 to 5.0 because the sensitivity of the product to air and mositure varies directly with the lithium content and at the higher lithium concentrations, this sensitivity poses a problem of handling the material without excessive decomposition. Lithium concentrations above 5 mole percent have no significant effect on crystallinity or density of the product.

The crystallization process of this invention can be carried out at temperatures in the range of 150° to 300°C. and at pressures in the range of 100,000 to 500,000 psig with excellent results, but satisfactory results may also be obtained at lower and higher temperatures and pressures.

The time required for the completion of the process of the invention is a complex function of the other variables, but a period in the range of from about 5 minutes to about 2 hours is generally satisfactory. The process of the invention may be carried out under any atmosphere inert to both the beryllium hydride and the lithium initiator compound. The use of dry nitrogen is preferred because of its availability and economy. Other suitable protective atmospheres include gaseous saturated hydrocarbons such as methane and ethane and the noble gases helium, neon, argon, krypton, and xenon.

The crystalline beryllium hydride product of this invention is a white to grayish powder consisting of small crystals, all measured samples of which have exhibited densities in excess of 0.75 gram per cc. The crystalline habit depends on the pressure employed and at least two different crystal species have been identified.

One form characterized by its strongest diffraction lines (in the order of their decreasing relative intensity) at $d = 3.38$ ($I/I_o = 100$), 2.079 (60), 1,347 (10), 1.780

(5), 3.22 (3), 2.94 (3), 2.84 (3), 2.69 (3) and 1.960 (3) has been indexed as being hexagonal with $a = b = 4.14$—$4.20A°$ and $c = 6.76A°$ with a calculated theoretical density of close to 0.82g/cc. The second crystalline form is characterized by its strongest diffraction lines (in the order of decreasing relative intensity) at $d = 3.78$ (100), 2.95 (80), 2.07 (40), 2.86 (20), 1.966 (10), 1.938 (4), 1.720 (4), 1.669 (3), 1.349 (3), 1.263 (3) 1.192 (3), 1.1396 (3), 1.0917 (3), and 1.835 (2).

Both forms are obtainable with equal facility by the described process of pyrolysis in the presence of an organo lithium compound or a simple or complex lithium hydride followed by compaction at the described conditions of elevated temperature and pressure. The conditions required for obtaining one form exclusive of the other depend on a number of variables and change from sample to sample so that such conditions must be defined for each individual preparation.

I claim:

1. A crystalline beryllium hydride-containing composite which consists essentially of from about 99.5 to about 80.0 mole percent of beryllium hydride and from about 0.5 to about 20.0 mole percent of lithium hydride.

2. A crystalline beryllium hydride-containing composite which consists essentially of from about 99.5 to about 80.0 mole percent of beryllium hydride and from about 0.5 to about 20.0 mole percent of lithium aluminum tetrahydride.

3. A crystalline beryllium hydride-containing composite which consists essentially of from about 0.5 to about 20.0 mole percent of a compound selected from the group consisting of lithium hydride and lithium aluminum hydride and from about 99.5 to about 80.0 mole percent of beryllium hydride and which is characterized by a density exceeding 0.75 gram per cc, by a predominantly hexagonal crystalline habit, and by intense X-ray diffraction lines at $d = 3.38$ and $d = 2.08$.

4. A crystalline beryllium hydride-containing composite which consists essentially of from about 0.5 to about 20.0 mole percent of a compound selected from the group consisting of lithium hydride and lithium aluminum hydride and from about 99.5 to about 80.0 mole percent of beryllium hydride and which is characterized by a density exceeding 0.75 gram per cc and by intense X-ray diffraction lines at $d = 3.78$ and $d = 2.95$.

5. The process for the preparation of a crystalline beryllium hydride-containing composite which comprises heating an amorphous beryllium hydride-containing composite which consists essentially of from about 99.5 to about 80.0 mole percent of beryllium hydride and from about 0.5 to about 20.0 mole percent of a lithium compound selected from the group consisting of lithium hydride, lithium aluminum tetrahydride and an alkyllithium wherein the alkyl radical contains from two to about eight carbon atoms at a temperature of from about 150° to about 300°C. and under a pressure of from about 100,000 to about 500,000 psig for a period of from about 5 minutes to about 2 hours.

6. The process of claim 5 wherein said lithium compound is n-butyllithium and wherein said heating is carried out at a temperature of from about 160° to about 200°C., under a pressure of from about 150,000 to about 250,000 psig and for a period of from about 10 to about 30 minutes.

7. The two-stage process for the preparation of crystalline beryllium hydride which comprises, in the first stage, pyrolyzing, while in solution in a solvent inert under the reaction conditions with respect to reactants and products and at a temperature in the range of from about 100° to about 200°C. sufficient to result in the formation of beryllium hydride, a mixture of a ditertiary alkyl beryllium etherate wherein each tertiary alkyl radical contains from four to 20 carbon atoms and about 0.5 to about 20 mole percent of a lithium compound selected from the group consisting of lithium hydride, lithium aluminum hydride and an alkyllithium wherein the alkyl radical contains from two to about eight carbon atoms, the pyrolysis being carried out under an atmosphere inert under the reacton conditions with respect to reactants and products, and separating the insoluble pyrolysis product and, in the second stage heating said pyrolysis product from the first stage at a temperature of from about 150° to about 300°C. and under a pressure of from about 100,000 to about 500,000 psig for a period of from about 5 minutes to about 2 hours and cooling the crystalline beryllium hydride while maintaining said pressure, thereby maintaining the crystallinity of said beryllium hydride.

8. The process of claim 7 wherein said lithium compound is n-butyllithium and wherein, in said second stage, said heating is carried out at a temperature of from about 160° to about 200°C., under a pressure of from about 150,000 to about 250,000 psig and for a period of from about 10 to about 30 minutes.

* * * * *

PO-1050
(5/69)

UNITED STATES PATENT OFFICE
CERTIFICATE OF CORRECTION

Patent No. 3,784,423                Dated  January 8, 1974

Inventor(s)  Paul Kobetz and Leonard M. Niebylaski

It is certified that error appears in the above-identified patent and that said Letters Patent are hereby corrected as shown below:

Title page, Item 75, "Leonard M. Niebylaski" should read -- Leonard M. Niebylski --. Column 4, line 7, "compounds bis" should read -- compounds are bis --; line 8, "diemthyldecyl" should read --dimethyldecyl; line 34, "mositure" should read -- moisture --; line 68, "1,347" should read -- 1.347 --. Column 6, line 29, "alkylithium" should read -- alkyllithium --.

Signed and sealed this 3rd day of September 1974.

(SEAL)
Attest:

McCOY M. GIBSON, JR.                C. MARSHALL DANN
Attesting Officer                   Commissioner of Patents